Patented Oct. 20, 1953

2,656,246

UNITED STATES PATENT OFFICE 2,656,246

PREPARATION OF ALKALI METAL ACID CYANAMIDE

Raymond A. Vingee, Stamford, Conn., and Ludwig J. Christmann, Bronxville, N. Y., assignors to American Cyanamid Company, New York, N. Y., a corporation of Maine No Drawing. Application April 17, 1951,
Serial No. 221,532

5 Claims. (Cl. 23—78)

The present invention relates to the preparation of a defoliant containing an alkali metal acid cyanamide.

It is an object of the invention to prepare such a defoliant in greater yield and at considerably less cost than has been possible in the past. A further object is to react calcium cyanamide and an alkali metal hydroxide in an aqueous medium with small loss of cyanamide nitrogen and with high conversion of calcium cyanamide to alkali metal acid cyanamide. A still further object is to dry the aqueous reaction mass under conditions that result in minimum decomposition. Additional objects will be apparent from the discussion hereinafter.

In arid regions, which are comparatively dewless, the alkali metal acid defoliants are considerably superior to calcium cyanamide. However, their application prior to the present invention was inhibited by their high cost, there being no means known to prepare them commercially in a price range comparable to that of calcium cyanamide. Such an economic means is disclosed in the present invention.

The probable reaction mechanism in converting calcium cyanamide to an alkali metal acid cyanamide can be written rather simply:

1. $2CaCN_2 + 2H_2O \rightarrow Ca(OH)_2 + [Ca(HNCN)_2]$
2. 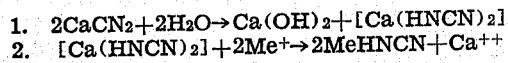

The ease with which this reaction can be carried out is, however, more apparent than real. Actually, it is very difficult to obtain good yields of alkali metal acid cyanamide by the above reaction. The main difficulty is the decomposition resulting from the evaporation of the aqueous medium. In these side reactions, cyanamide nitrogen tends to be converted to urea, ammonia, and the like. As a matter of fact, in investigating conditions necessary to provide a maximum yield of alkali metal acid cyanamide while simultaneously reducing the decomposition of cyanamide nitrogen to a minimum, it was found that several factors were critical, such as the amount of water in the reaction mass, the temperature of reaction, the alkali metal compound chosen, and magnitude of vacuum during drying.

The following example illustrates without limiting the invention.

Example 1

A solution of one part by weight of a wetting agent (described in more detail below) in 240 parts of water is prepared in a vacuum drier of any suitable commercial type, such as the Stokes drier. To this solution 360 parts of lime nitrogen (crude calcium cyanamide) containing 230 parts of calcium cyanamide are added with mixing, followed by 115 parts of sodium hydroxide with mixing. The slurry is heated for one hour at 70° C. with mixing. The jacket of the drier is heated with hot water or steam during the drying operation, during which operation the drier pressure is reduced to 2–3 inches of mercury and the mixture agitated until the moisture content reaches a suitable value, namely about 1%, which may require an additional hour or two, and then the mixture is discharged. 510 parts of solid material is recovered, containing about 25% of sodium acid cyanamide.

The reactants may be added in any order without affecting the yield of material.

For use as a dust defoliant the product taken from the drier need only be ground to the desired fineness and is then ready for application.

An evaporation temperature within the range of 60°–80° C. is necessary to the commercial operation of the process. The grade of material falls off sharply below or above this range. Within this critical range a temperature of about 65°–75° C. is preferred as giving the highest yields.

It is a further peculiarity of the reaction that only the alkali metal hydroxides give good yields of alkali metal acid cyanamides by this process.

While it is necessary to use an amount of water sufficient to insure an ionic double decomposition reaction, it is also important to keep the volume of water low in order to avoid a long evaporating period which tends to decompose the cyanamide ion. It will be readily appreciated that the amount of water suitable for the commercial production of sodium acid cyanamide falls within a narrow range. Obviously, at least a stoichiometric quantity of water should be present. However, beyond this amount that quantity present should be reduced as much as possible to avoid excessive drying times. While relatively large quantities of water can be used, such as 10–15 mols or even more, per mol of calcium cyanamide, it has been found that as little as about 1.5–5 mols of water per mol of contained calcium cyanamide can be used. The smaller quantity of water is preferred when following the procedure of Example 1, and the larger amount when extracting a high-grade acid cyanamide by the process of Example 2.

The calcium cyanamide need not be pure, and, as a matter of fact, the rather impure commercial calcium cyanamide known as lime nitrogen is quite satisfactory for use in practicing this invention. When using lime nitrogen the stoichiometric quantity of calcium cyanamide should be calculated on the basis of the amount contained in the lime nitrogen. This will generally fall within the range 56–69%. In the interests of economy the amount of alkali metal hydroxide should be approximately theoretical, though a commercial grade of defoliant can be obtained when the amount of hydroxide is only 80% of theoretical.

While it is not necessary to use a wetting agent in the process, it has been found that the addition of a small amount—even as low as one part in 500 parts of reactants—reduces the consistency of the reaction mass to a remarkable degree and permits the use of a minimum amount of water and a minimum amount of power consumption in stirring the mass. The result is a shorter reaction period with an overall gain in the grade of sodium acid cyanamide. Thus, the use of a wetting agent serves two unrelated ends, namely, it improves the grade of material while simultaneously producing a product that can be used as such in arid areas. The wetting agent used should be stable to calcium ions. Among such wetting agents are the various sulfonated wetting agents such as Turkey red oil, the wetting agent known as "nytron" made by reacting long-chain olefins with nytrosyl chloride and preparing an adduct with sodium sulfite. Still other suitable wetting agents are the alkylated aryl sulfonates such as "naccanol," "aerosol OS," and the like.

Of course, the wetting agents chosen must be stable within the temperature range 60°–80° C.

Another critical feature of the invention is the amount of partial vacuum necessary. Very poor yields are obtained with subatmospheric pressures greater than about 12 inches of mercury, but when the pressure over the reaction mass drops to 8 or 9 inches of mercury or preferably less, assuming a low water concentration, such as 1.5 mols to 1 of calcium cyanamide, the grade becomes acceptable. However, with relatively greater water concentrations, such as 10 to 1 of calcium cyanamide, the partial vacuum should be not more than ½ to 1 inch.

It is of course possible to conduct the initial reaction and the subatmospheric drying as separate steps in separate vessels, rather than in one simultaneous operation in a vacuum dryer. In such case it is important to keep the temperature in the reaction vessel below 80° C., and preferably much lower. In fact it has been found that one hour at 40° C. is preferred if an initial reactor at atmospheric pressure is used. The reaction is substantially complete within an hour at 40°–80° C., and the slurry can then be passed into the vacuum dryer for final treatment, or, if a high-grade sodium acid cyanamide is desired relatively free from calcium hydroxide, the reaction slurry is first filtered and washed and the clear aqueous solution of alkali metal acid cyanamide passed into the vacuum dryer. In one such run (Example 2), about 175 parts by weight of lime nitrogen (containing about 65% $CaCN_2$), about 56 parts of sodium hydroxide, and about 350 parts of water (corresponding to the respective mol ratio of 1:1.4:14) were reacted at 40° C. for one hour, with stirring, after which the resultant slurry (containing about 96 parts of sodium acid cyanamide in solution) was filtered. The filter cake (containing about 120 parts of water) was washed with about 120 parts of water containing about 3% sodium acid cyanamide and 3% sodium hydroxide, and the filtrate and wash liquors were combined (about 20–22% solids at this point) and passed into a vacuum evaporator/dryer at about 75° C. and about 3 inches of mercury.

When the operation is continuous, it is desirable to remove water in plural vacuum evaporators rather than in one vessel. Thus, in one modification of the above run, the combined filtrate and wash liquors were first pumped into a flash evaporator at 75° C. and 3 inches of mercury and concentrated to produce a slurry containing about 57–58% solids before pumping to the final vacuum dryer. The final vacuum drying was carried out at about 65–70° C. and ½ to 1 inch Hg for 1½ hours, giving a product dry to the touch analyzing about 95% total solids and containing 78–80% sodium acid cyanamide, an overall yield on a continuous basis of about 85%, based on the lime nitrogen. The product so produced contains a little urea, dicyanamide, and sodium hydroxide.

This is a continuation-in-part of applicants' copending application Serial No. 129,166, filed November 23, 1949, now abandoned.

While the invention has been described with particular reference to specific embodiments, it is to be understood that it is not to be limited thereto but is to be construed broadly and restricted solely by the scope of the appended claims.

We claim:

1. The method that comprises reacting calcium cyanamide, alkali metal hydroxide, and water in the respective mol ratios of 1 to at least 0.8 to at least 1.5, at a temperature of 40–80° C., whereby an aqueous dispersion of alkali metal acid cyanamide is formed, and removing water from said dispersion by subjecting it to subatmospheric pressure not exceeding 9 inches of mercury and to a temperature of about 60°–80° C.

2. The method according to claim 1 in which the alkali metal hydroxide is sodium hydroxide.

3. The method according to claim 2 in which the aqueous sodium acid cyanamide is separated from the solid reaction mass before removing water from the said sodium acid cyanamide.

4. The method according to claim 1 in which the reaction is conducted in the presence of a calcium stable wetting agent.

5. The method of preparing sodium acid cyanamide that comprises heating together lime nitrogen, caustic soda, and water in the respective $CaCN_2:NaOH:H_2O$ mol ratio of about 1:1.5:15, at a temperature of 40–80° C., separating the aqueous dispersion of sodium acid cyanamide thus obtained from the solids present, and subjecting said dispersion to subatmospheric pressure of not more than about one inch of mercury at a temperature of 65°–70° C. to remove water, whereby dry high grade sodium acid cyanamide is obtained.

RAYMOND A. VINGEE.
LUDWIG J. CHRISTMANN.

References Cited in the file of this patent

UNITED STATES PATENTS

| Number | Name | Date |
|---|---|---|
| Re. 12,762 | Frank | Mar. 19, 1908 |
| 796,713 | Foersterling | Aug. 8, 1905 |
| 1,098,651 | Washburn | June 2, 1914 |
| 1,196,910 | Washburn | Sept. 5, 1916 |
| 1,622,731 | Muckenfuss | Mar. 29, 1927 |
| 2,213,440 | Ashley | Sept. 3, 1940 |
| 2,368,274 | Torley | Jan. 30, 1945 |
| 2,557,997 | Phelps | June 26, 1951 |

FOREIGN PATENTS

| Number | Country | Date |
|---|---|---|
| 571,340 | Great Britain | Aug. 21, 1945 |